United States Patent

[11] 3,571,880

| [72] | Inventor | John R. Andrew |
| | | Columbus, Ohio |
| [21] | Appl. No. | 814,081 |
| [22] | Filed | Apr. 7, 1969 |
| [45] | Patented | Mar. 23, 1971 |
| [73] | Assignee | The Columbus Auto Parts Company |
| | | Columbus, Ohio |

[54] METHOD OF ASSEMBLING PIVOT JOINTS
8 Claims, 7 Drawing Figs.

[52] U.S. Cl. .................................................. 29/149.5
[51] Int. Cl. .................................................. B23p 11/00
[50] Field of Search .......................................... 29/149.5;
219/107; 287/87, 90

[56] References Cited
UNITED STATES PATENTS
| 1,606,894 | 11/1926 | Phelps | 219/107 |
| 1,665,468 | 4/1928 | Murray, Jr. | 219/107X |
| 2,871,315 | 1/1959 | Dales | 219/107X |
| 3,197,842 | 8/1965 | Parker | 29/149.5 |
| 3,464,723 | 9/1969 | Herbenar | 287/87 |

Primary Examiner—Thomas H. Eager
Attorney—Schmieding and Fultz

ABSTRACT: A method of fabricating flexible joints such as are used in automotive-steering linkages or the like wherein upper and lower electrically conductive housing portions are fused together at a junction to accurately preload internal seat means in a precisely controlled manner so as to exert a predetermined force upon a pivotal head member within the joint and thereby achieve uniform torque transmitting and vibration damping characteristics that are accurately maintained throughout the operational life of the flexible joint.

INVENTOR.
JOHN R. ANDREW
BY
Schmieding & Fultz
ATTORNEYS

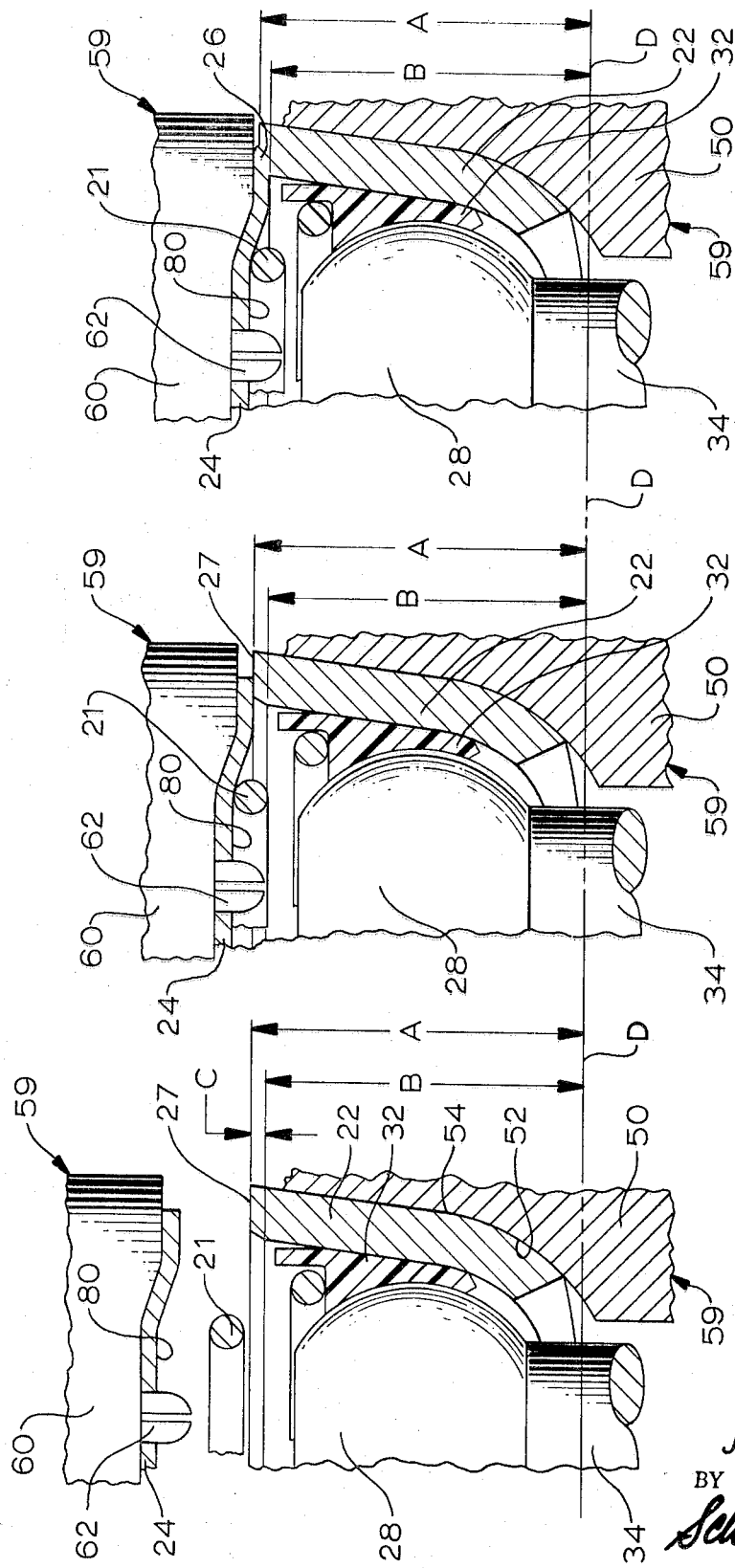

METHOD OF ASSEMBLING PIVOT JOINTS

This invention relates generally to flexible joints and more particularly to a new and improved method of assembling such devices of the type that are used in automobile-steering linkages or the like.

In general, the present invention consists of a novel method for precisely assembling the components of flexible joints at high rates of production which method accurately preloads internal seat means in a precisely controlled manner so as to exert a predetermined force upon the pivotal head member of the joint and thereby achieve uniform torque transmitting and vibration damping characteristics that are maintained throughout the operational life of the joint.

More particularly, the method of the present invention comprises, for example, assembling a pivotal ball or head member within a seat means in a cavity-forming housing portion that is later to be closed with a closure-forming housing portion or cap. The seat means is preferably formed of a synthetic polymer bearing material such as nylon or the like that is biased by a preloaded spring means. The two housing portions are then joined in a novel controlled manner so as to compress against the seat means and thereby effect the above-mentioned predetermined frictional force on the pivotal head member. It has been determined by laboratory tests and field studies of flexible joints of this type that when the preloading of the spring and seat means is insufficient the joint will not effectively resist shock loads nor will they absorb road imposed vibrations.

Moreover, hammering of the internal components of the joint will occur which results in excessive wear of the internal components and associated linkage.

On the other hand, if the cap or upper housing portion is too tightly assembled against the internal deformable seat then excessive swivel torque values, or actual binding of the internal components will occur.

It has further been determined that the maximum in fatigue life can be achieved, by the joint closure method of the present invention, if the above-mentioned spring and seat means are preloaded to a predetermined value and the two housing portions are joined in a novel controlled manner to maintain such preload.

In accordance with the method of the present invention the two housing portions are secured together by first supporting a cavity-forming housing portion, with the internal joint components assembled therein, in a recess of a lower electrode of a resistance welding apparatus with the recess surface conforming in shape with and in electrically conductive contact with the exterior surface of such housing portion. The cap, or closure-forming housing portion is next supported on an upper electrode of said resistance welding apparatus so as to be in electrically conductive contact therewith.

The upper electrode that positions the cap is next actuated to cause the cap to engage the cavity-forming housing portion at an annular junction and the electrodes are then energized to heat said junction. At the same time the electrodes are used to apply pressure to the engaged housing portions and thereby cause the metal to upset at said annular junction, and the application of pressure is continued up to some predetermined electrode pressure value, to cause the cap to move down through an annular zone of localized plasticity at said junction until the cap has biased the spring and seat means by a predetermined amount which will preload the seat against the pivotal head with a predetermined frictional force. It has been determined that such predetermined electrode pressure can be accurately established and automatically controlled by the seating of controls for the resistance welding apparatus so as to achieve the above mentioned predetermined force. This permits the establishment of said preloaded force without the occurence of excessive swivel torque values or actual locking of the internal parts of the joint.

As another aspect of the present invention, the present method uniquely provides a housing construction formed of integrally fused housing portions joined at an annular zone of superior strength. This results in superior "cap pushout resistance" as compared to prior methods employed in the production closing of flexible joints.

As another aspect of the present invention the novel method of establishing a predetermined preloading of the spring and seat means during the actual joining of the housing portions results in substantial savings in labor and tooling as compared to conventional joint closure methods. It should be mentioned that prior to the present invention it has been the practice to attach closure-forming housing portions by spinning, curling, or staking the upper edge of the cavity-forming housing portion so as to overly the peripheral edge of said closure-forming housing portion. Such prior methods required precise preassembly machining of the upper cap-receiving edge of the cavity-forming housing portion to establish precise concentricity. Such conventional operations have been very complex and expensive with respect to tool cost and maintenance.

In contrast, with the method of the present invention the previously discussed predetermined frictional force can be accurately established during the closing of the joint by applying a predetermined electrode pressure.

It is therefore an object of the present invention to provide a new and improved method of assembling pivot joints which permits precise control of the preloading of internal seat means, and resulting swivel torque values, during the actual assembly of the joints.

It is another object of the present invention to provide a high production method of assembling pivot joints wherein the predetermined preloading of internal seat means can be precisely established by the controlled application of resistance heating together with the application of predetermined electrode pressure values.

It is another object of the present invention to provide a method of the type described that results in improved pivot joints wherein hammering of the internal components during operational use is prevented, with a resulting increase in fatigue life.

It is another object of the present invention to provide a method of the type described that produces pivot joints wherein the occurence of excessive or insufficient swivel torque values can be eliminated.

It is another object of the present invention to provide a method of the type described that produces pivot joints wherein a closure-forming housing portion is integrally fused to a cavity-forming housing portion at an annular junction of superior strength. As a result the resistance of internal "-pushout" forces, imposed by the internal pivoted head on the housing, is substantially increased.

It is another object of the present invention to provide a method of the type described that produces pivot joints with reduced machining costs as compared to prior production methods.

Further objects and advantages of the present invention will be apparent from the following description, reference being had to the accompanying drawings wherein a preferred form of the embodiment of the invention is clearly shown.

IN THE DRAWINGS

FIGS. 5 through 7 are partial side sectional views illustrating steps in the method of the present invention, the sections being taken along a vertical plane through the centerline of positioning electrodes with the pivot joint components supported thereon.

Figures 1, 2:
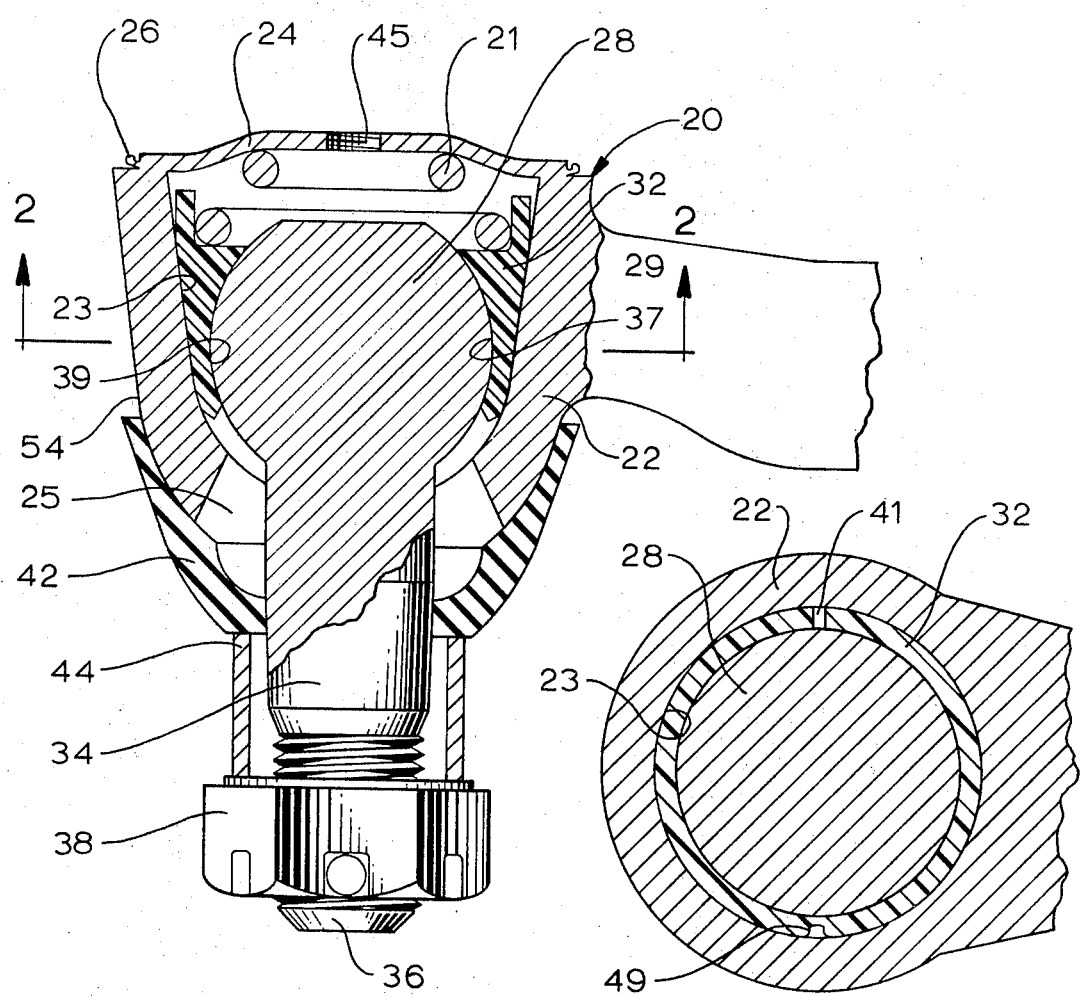
FIG. 1 is a partial side sectional view of a pivot joint constructed in accordance with the method of the present invention, the section being taken along a vertical plane through the centerline of the device.
FIG. 2 is a transverse cross-sectional view taken along the line 2—2 of FIG. 1.

Referring in detail to the drawings, a pivot joint constructed in accordance with the method of the present invention is illustrated in FIG. 1 and comprises housing means indicated generally at 20 formed from a lower or recess forming housing portion 22 and an upper or closure-forming housing portion 24 which are integrally fused at a junction 26.

The pivot joint of FIG. 1 further includes a pivotal head 28 and a seat means 32 having an internal surface 37 that frictionally engages an external surface 39 of said head.

Seat means 32 is preferably constructed of a synthetic resinous bearing material such as the material distributed under the name of Delrin, although any other suitable abrasive resistant, low friction material such as nylon or the like may be used satisfactorily. Seat means 32 is supported at outer surface 29 by a conforming inner surface 23 of lower housing portion 22.

As seen in FIG. 2, a slot 41 and notch 49 in seat means 32 permit the seat to be assembled on pivotal head 28 and also serve to permit the seat means to adjust to any slight dimensional irregularities in the size of the cavity in lower housing portion 22.

As seen in FIGS. 1 and 2, upper housing portion 24 is provided with a central hole 45 for the admission of lubricant to the engaging frictional surfaces 37 and 39.

Head 28 includes a shank portion 34 provided with a threaded lower end 36 and a nut 38 for attaching the pivotal head 28 to adjacent structure in operational use.

Referring again to FIG. 1 the lower portion of the flexible joint between the lower seat 32 and pivotal head 28 is sealed by a dust cover 42 formed of an elastomer such as Neoprene or the like. A cylindrical ferrule 44 is mounted between dust cover 42 and nut 38.

Figure 3:
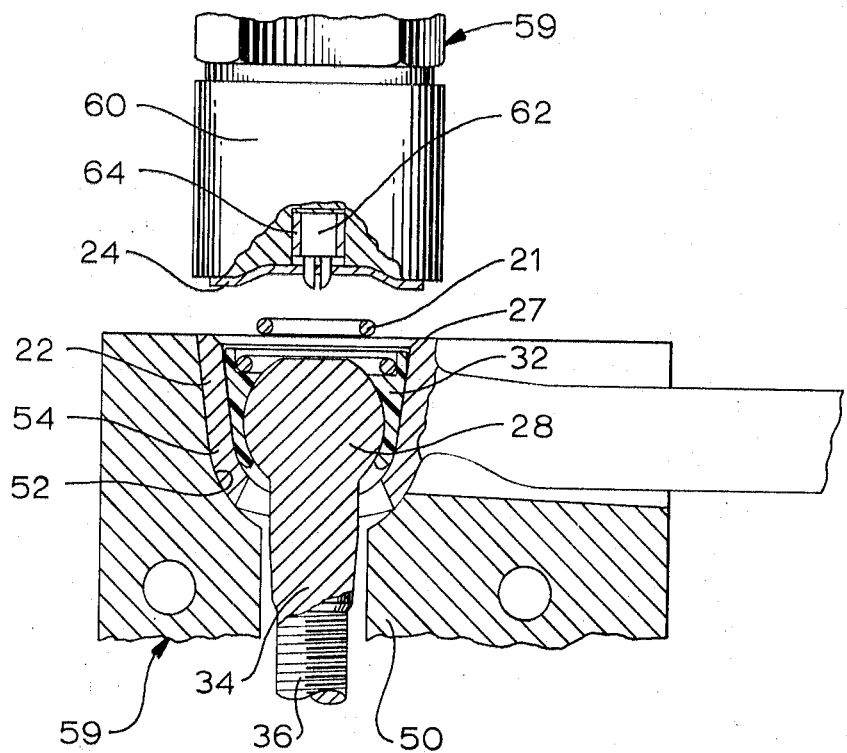
FIG. 3 is a partial side sectional view showing the housing portions of the pivot joint of FIG. 1 positioned on upper and lower positioning electrodes arranged in accordance with the method of the present invention, the section being taken along a vertical plane through the centerline of the device.
Figure 4:
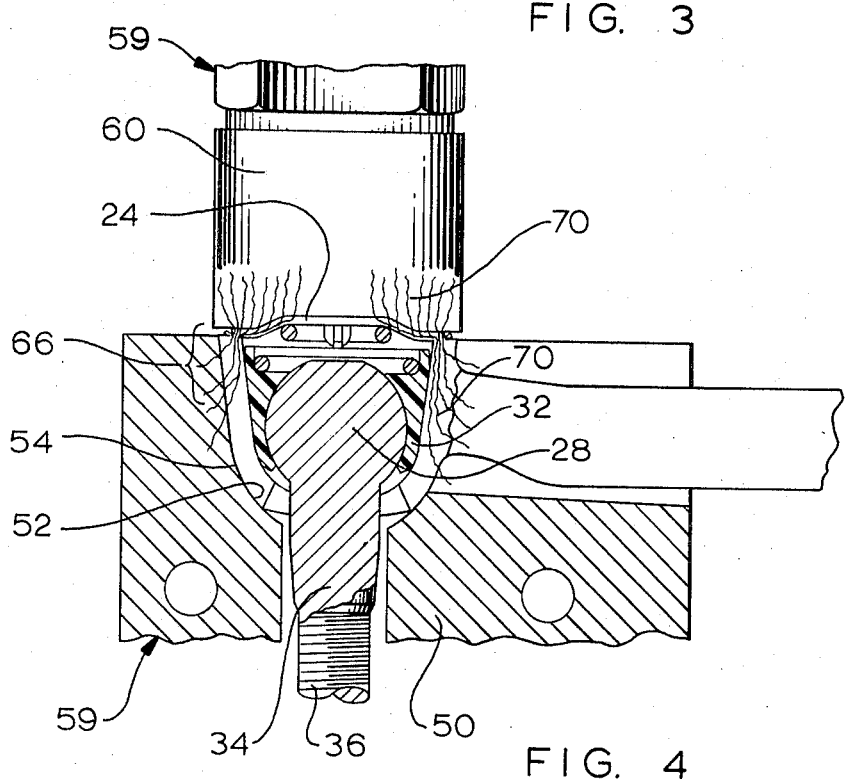
FIG. 4 is a partial side sectional view corresponding to FIG. 3 and showing the electrodes in an energized position.

Reference is next made to FIGS. 3 and 4 which illustrate the application of the method of the present invention in the assembly of the pivot joint of FIG. 1 wherein it will be seen that the components of such joint are assembled in a unique manner by application of controlled resistance heating and electrode pressure to upset and fuse the housing portions in a precise manner.

In preparing the recess-forming housing portions 22 for assembly in accordance with the present invention the sequence of operations are as follows:
1. To forge to shape;
2. Coin to finish inner surface 23;
3. Pierce bottom opening 25;
4. Face off top surface 27 to establish a predetermined dimension A greater than the desired finished dimension B as shown in FIGS. 5—7;
5. Mill bottom opening 25 to establish proper angularity for required range of motion of shank 34;
6. Assemble internal components in recess-forming housing portion 22;
7. Apply heat and pressure in a controlled manner to upset and fuse housing portion;

In preparing lower housing portions such as 22 for conventional assembly the sequence of operations are as follows:
1. Forge to shape;
2. Coin to finish inner surface 23;
3. Pierce bottom opening 25;
4. Turn, counterbore and face to prepare a recess, not illustrated, for receiving a closure-forming housing portion;
5. Mill bottom opening 25 to establish proper angularity for required range of motion of shank 34;
6. Assemble internal components in cavity-forming housing portion 22;
7. Attach upper housing portion by spinning, curling, or staking the upper edge of the lower housing portion so as to overly the peripheral edge of the upper housing portion and thereby retain same.

It will now be seen that the differences in the two methods occur in steps 4 and 7. It should be pointed out that step 4 of the conventional method is quite expensive with respect to both labor and tooling since accurate concentricity must be maintained between the turn and counterbore operations, as well as with the body of the socket. It should be emphasized that the tools to perform these conventional operations are very complex and expensive.

In contrast, with the method of the present invention it is merely necessary to face off the top surface 27 of the lower housing portion to establish a predetermined dimension A above a reference datum D so far as the preparation step 4 is concerned.

FIG. 3 illustrates a portion of an apparatus 59 for practicing the present method which includes a lower electrode 50 for positioning lower housing portion 22 with an inner surface 52 of said electrode conforming in shape with an outer surface 54 of said lower housing portion.

The apparatus 59 for closing flexible joint 20 further includes a movable upper electrode 60 which serves to position the previously mentioned closure-forming housing portion 24 as well as means for applying pressure to the housing portions.

As seen in FIG. 3 upper electrode 60 includes a split pin 62 which is insulated from electrode 60 by a layer of insulation 64.

The above-mentioned lower electrode 50 and upper electrode 60 are energized and pressurized by an electric resistance projection welding machine, of a press type, which may be air operated and provided with automatic voltage control. With a machine of this type and with the electrodes constructed in accordance with the present application, the heating, application of pressure, and upsetting of metal are concentrated in a precisely controlled manner in a localized zone in the housing portions at their junction.

Reference is next made to FIG. 4 which illustrates the same upper electrode 60, and lower electrode 50 in a pressure applying configuration wherein the upper housing portion or cap 24 has been brought into engagement with an upper edge 27 of lower housing portion 22.

In this configuration of FIG. 4 the upper and lower electrodes 60 and 50 have been energized to upset metal and fuse the junction of a peripheral edge of cap 24 and upper edge 27 of lower housing portion 22.

It is important to note that electrical energy is concentrated at an annular zone at said junction as is indicated by the diagrammatic lines representing current flow as seen at 70 in FIG. 4.

Reference is next made to FIGS. 5, 6, and 7 which diagrammatically illustrate, in more precise detail, the method of fabricating flexible joints in accordance with the present invention.

FIG. 5 illustrates the previously mentioned lower positioning electrode 50 and an upper positioning electrode 60, with said electrodes serving to respectively position lower cavity-forming housing portion 22 and upper closure-forming housing portion 24. Here it should be mentioned that lower cavity positioning electrode 50 includes inner surface 52 which substantially conforms in shape with outer surface 54 of said lower housing portion. Such surface conformation makes the metal of the lower housing portion 22 and the electrode 50 in such intimate conductive contact that the electrical energy transmitted to junction 66 can be most efficiently applied to the upsetting and fusing of such junction.

FIG. 6 illustrates the next step in the present method wherein the upper electrode 60 has been moved downwardly so as to bring upper housing portion 20 into engagement with lower housing portion 22. It will be noted, FIG. 6, that an under surface 80 of upper housing portion 24 has started to compress spring means 21 on the top of upper seat 30 and thereby preload seat means 32 towards a predetermined frictional engagement force with the outer surface 39 of pivotal head 28. At this point the previously mentioned upsetting and fusing apparatus 59 is energized to thereby concentrate its heating effect at the annular junction 66 between the two housing portions. At the same time pressure is applied to the joint by the apparatus such that upper electrode 60 moves upper housing portion 24 downwardly for a dimension equal to a predetermined dimension C whereby lower surface 80 on the upper housing portion is moved downwardly to a terminal dimension B as will be best seen in FIGS. 6 and 7.

It is important to note that after such downward movement of the lower surface 80 of upper housing portion 24 the ultimate dimension B represents a predetermined dimension with respect to a reference datum D at which seat means 32 exerts a predetermined preload force on pivotal head 28 whereby the frictional resistance imposed by the seat surfaces on the head surfaces provides the desired predetermined swivel torque value for the pivot joint.

At the time that electrode 60 arrives at its terminal position of FIG. 7 wherein the lower surface 80 of the closure forming housing portion 24 is located at predetermined dimension B from the reference datum B, the electrical energy previously discussed is terminated whereby the upset junction 66, FIG. 4 and FIG. 7, will solidify thereby locking closure-forming housing portion 24 in the position shown in FIG. 1 and FIG. 7. In this position seat means 32 is precisely biased to provide the above described predetermined preload by the application of electrical energy and the predetermined electrode pressure to the annular zone at junction 66 in FIG. 4.

It will now be understood that by the controlled application of heat and pressure and by using an apparatus 59 which is pressure controlled automatically, it is possible to sequentially assembly pivot joints at high production rates such that the preloaded frictional force exerted by the seat means and the resulting swivel torque values accurately fall within acceptable limits.

I claim:

1. The steps in the method of assembling flexible joints of the type that include first and second housing portions defining a cavity, said second housing portion engaging said first housing portion at a junction, said method comprising positioning in said cavity a pivotal head including an outer head surface, a seat means formed of synthetic resinous material and including an inner seat surface frictionally engaging said outer head surface, and a spring means interposed between said seat means and one of said housing portions for biasing said seat surface against said head surface; applying electrical energy to electrically conductive housing portions at said junction at a localized zone and a predetermined pressure to upset said junction and compress said spring means to effect a predetermined preloaded spring force therein whereby said seat surface is biased against said head surface so as to exert a predetermined frictional force thereon.

2. The method defined in claim 1 wherein said surfaces are spherical, and wherein said seat means partially surrounds said pivotal head and includes a slot that permits spreading of said seat means for the insertion of said pivotal head therein.

3. The steps in the method of assembling flexible joints of the type that include first and second housing portions defining a cavity, said second housing portion engaging said first housing portion at a junction, said method comprising forming a tapered inner housing surface in one of said housing portions; positioning in said cavity a pivotal head including an outer head surface, a seat means formed of synthetic resinous material and including a tapered outer seat surface engaging said tapered inner housing surface and an inner seat surface frictionally engaging said outer head surface, and a spring means interposed between said seat means and the other of said housing portions for biasing said seat surface against said head; applying electrical energy to electrically conductive housing portions at said junction at a localized zone and a predetermined pressure to upset said junction and compress said spring means to effect a predetermined preloaded spring force that urges said tapered outer seat surface into said tapered inner seat surface to thereby bias said seat means radially inwardly so as to exert a predetermined frictional force on said pivotal head.

4. The method defined in claim 3 wherein said inner seat surface and outer heat surface are spherical, and wherein said seat means partially surrounds said pivotal head and includes a slot that permits spreading of said seat means for the insertion of said pivotal head therein.

5. The steps in the method of assembling flexible joints of the type that comprises a cavity-forming housing portion including a cavity and an opening defined by an annular edge, a closure forming housing portion including a peripheral edge, said method comprising:

a. placing an electrically conductive cavity-forming housing portion in a recess of a cavity-positioning electrode, the shape of said recess substantially conforming with a portion of the exterior of said cavity-forming housing portion;

b. positioning in said cavity a pivotal head including an outer head surface a seat means formed of synthetic resinous material and including an inner seat surface frictionally engaging said outer head surface, and a spring means interposed between said seat means and one of said housing portions for biasing said seat surface against said head surface;

c. positioning an electrically conductive closure-forming housing portion adjacent said opening with said edges aligned with one another;

d. applying pressure to a closure-positioning electrode engaging the outer side of said closure-forming housing portion to move said electrodes towards one another, said electrodes being energized whereby current is concentrated in an annular zone at said edges of the housing portions thereby providing an annular zone of local plasticity whereby said pressure and energy cause the flow of metal in said zone permitting relative movement of said housing portions towards one another; and deenergizing said electrodes at a predetermined pressure value whereby said housing portions are integrally fused at said zone with said closure forming housing portion compressing said spring means to effect a predetermined preloaded spring force therein whereby said seat surface is biased against said head surface so as to exert a predetermined frictional force thereon.

6. The method defined in claim 5 wherein said surfaces are spherical and wherein said seat means partially surrounds said pivotal head and includes a slot that permits spreading of said seat means for the insertion of said pivotal head therein.

7. The steps in the method of assembling flexible joints of the type that comprises first and second housing portions engaging one another at a junction, a seat-engaging surface on said first housing portion, a spring engaging surface on said second housing portion, a seat means formed of synthetic resinous material and including an outer seat surface engaged by said seat-engaging surface, and an inner seat surface, a pivotal head including an outer head surface frictionally engaged by said inner seat surface, and a spring means interposed between said spring engaging surface and said seat means, said method comprising:

a. positioning the above-mentioned components including electrically conductive housing portions between spaced electrodes with each electrode conforming with and engaging the exterior of a respective one of said housing portions;

b. moving certain of said electrodes to cause engagement of said housing portions at said junction with the space between said spring engaging surface and a reference datum D being substantially equal to a selected dimension A; and c. energizing said electrodes while applying pressure to said housing portions to upset metal at said junction and thereby compress said spring means and decrease said dimension A by an amount substantially equal to a dimension C whereby the space between said spring engaging surface and reference datum D is established at a predetermined dimension substantially equal to B.

8. The steps in the method of assembling flexible joints which method comprises:
   a. forming first housing portions each of which includes an upper edge surface located a predetermined dimension A above a reference datum D;
   b. forming second housing portions each of which includes an internal seat-engaging surface and a peripheral edge;
   c. forming seat means of synthetic resinous material;
   d. forming pivotal heads;
   e. forming second internal seats of elastomeric material to a predetermined volume V-s;
   f. positioning a first housing portion in the cavity of a first positioning electrode, the shape of said cavity conforming with a portion of the exterior shape of said first housing portion;
   g. positioning said seat means and a head in stacked relation in said first housing portion;
   h. positioning a second housing portion in engaged relationship with a second positioning electrode with said peripheral edge surface confronting said outer edge surface with the dimension between said internal seat-engaging surface and said reference datum D being substantially equal to said predetermined dimension A;
   i. energizing said electrodes and moving one of said electrodes towards the other of said electrodes to apply heat and pressure to an annular zone at the junction of said edges and thereby upset certain of said edges; and
   j. continuing the application of said pressure and movement of said electrode to a predetermined pressure value to decrease dimension A by a selected dimension substantially equal to a dimension C and thereby fuse said edges with the vertical dimension between said internal seat engaging surface and said reference datum D being substantially equal to a predetermined dimension B at which position the predetermined preload of said spring means effects a predetermined preloaded spring force therein whereby said seat surface is biased against said head surface so as to exert a predetermined frictional force thereon.